Inventor:
Richard S. Page,
by Paul A. Frank
His Attorney.

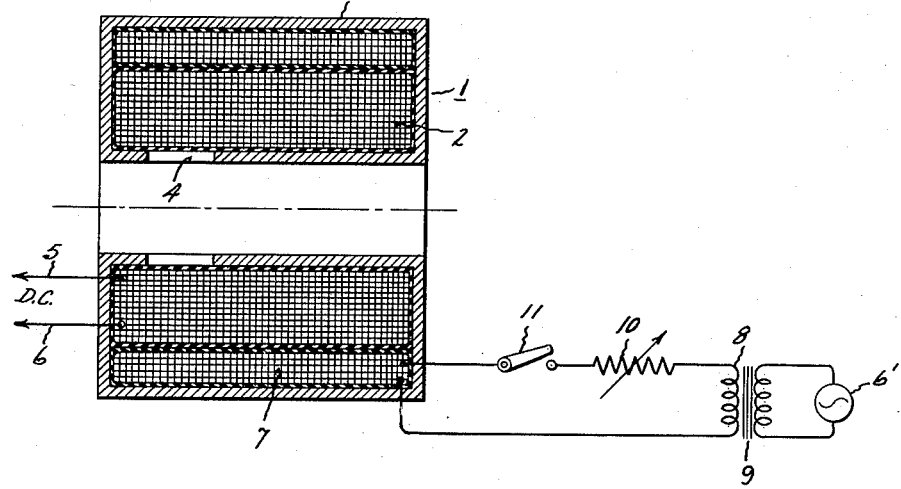
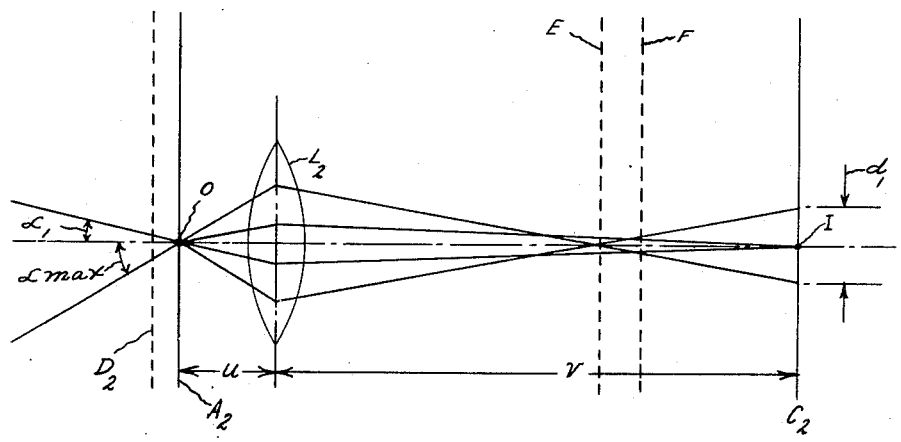

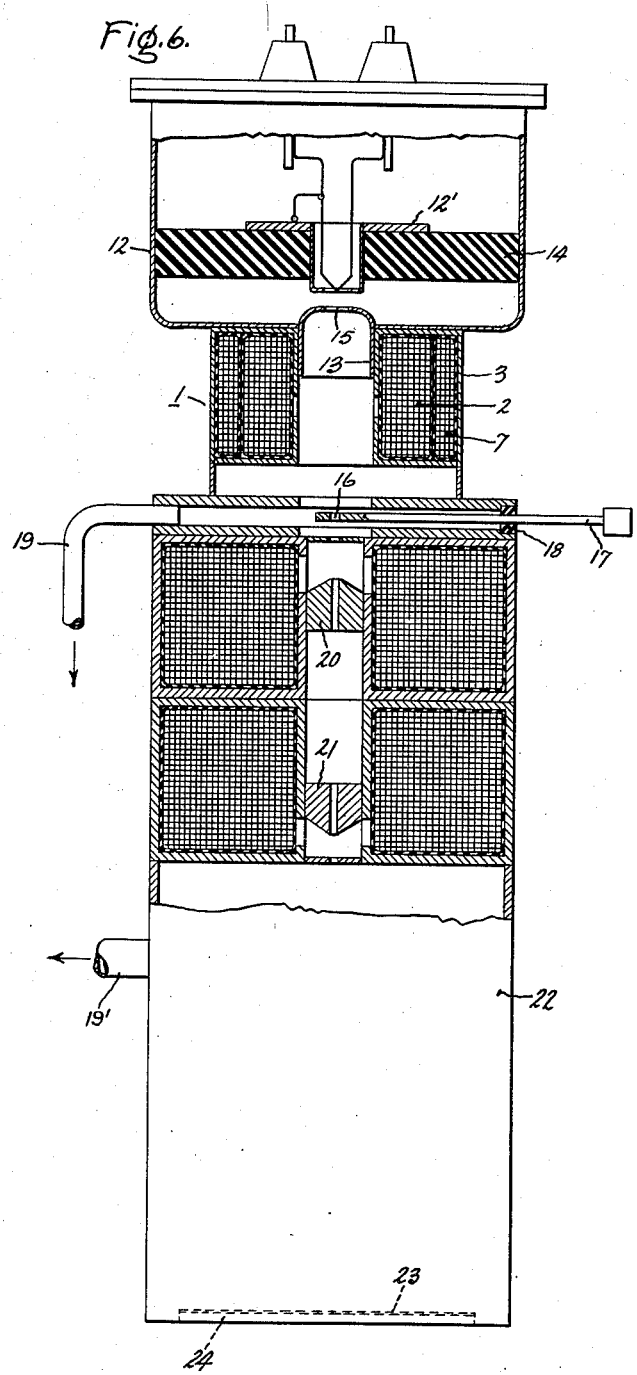

Patented Dec. 1, 1953

2,661,427

UNITED STATES PATENT OFFICE 2,661,427

FOCUSING AID FOR ELECTRON MICROSCOPES

Richard S. Page, Stretford, Manchester, England, assignor to General Electric Company, a corporation of New York Application November 29, 1950, Serial No. 198,053

Claims priority, application Great Britain February 23, 1950

15 Claims. (Cl. 250—49.5)

This invention relates to electron microscopes and has for its object the provision of means for facilitating visual focusing.

In electron microscopy the image forming lenses work at a very low numerical aperture in order to combat the effects of spherical aberration. One result is that the depth of focus in the image may be nearly 1,000 times greater than the size of the minimum resolved distance. In spite of this it is still a matter of considerable difficulty to obtain a correctly focused image. The principal reason for this difficulty is to be found in the poor resolving power of the eye compared with that of the photographic plates used for recording the images. It is usual, for high resolution working, to photograph the image at a magnification of between 10 and 20 thousand times in an instrument capable of resolving a distance of say 20 angstrom units (A. U.). At the viewing screen of the instrument a distance of 20 A. U. appears as .02 mm. at 10,000 times. Although the photographic plate can easily resolve this distance, the unaided eye can only resolve about 0.1 mm. therefore, a considerable uncertainty exists as to exact focus.

The unsharpness, or diffusion, of the image due to a certain amount of defocusing is a function of the working aperture of the objective lens in the microscope so that, if the aperture can be increased while focusing is carried out, a nearer approximation to exact focus can be obtained.

In accordance with the present invention, the position of the apparent source of electrons irradiating the object during focusing is caused to fluctuate rapidly along the common axis of the objective lens and electron source so that the angle subtended by the apparent source at the object, and hence the angular aperture of the objective lens, is continuously varied.

Figure 1:
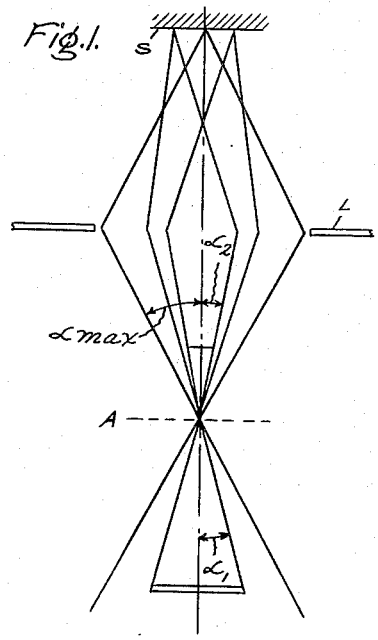
Figure 2:
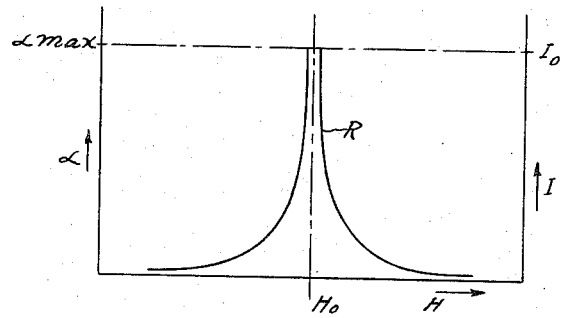
Figure 3:
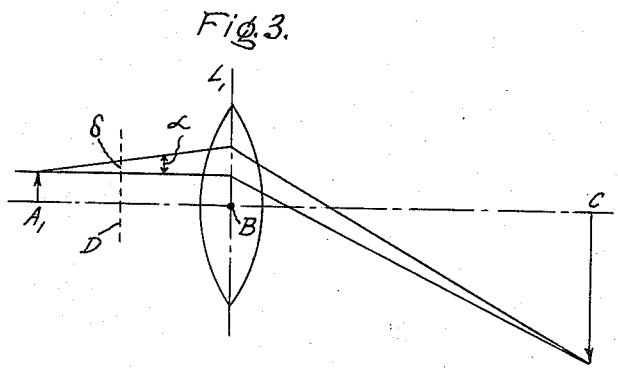
Figure 4:
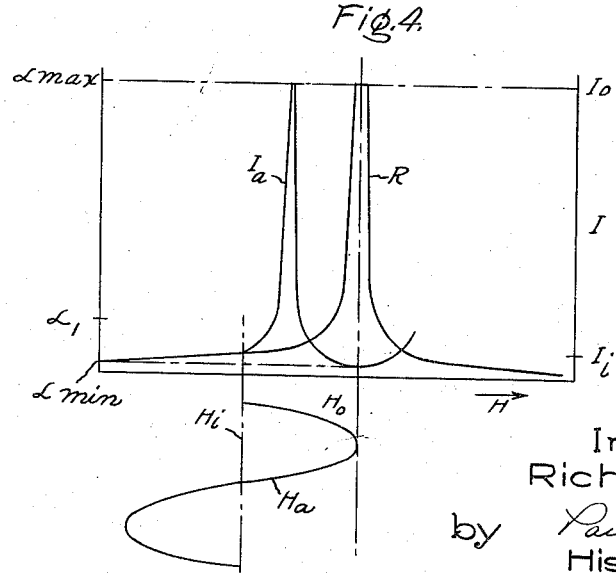

The invention will now be described with reference to the accompanying diagrammatic drawings, in which:

Fig. 1 shows a typical illuminating system,

Fig. 2 is a curve showing the change in intensity of the illumination and the change of aperture as the strength of a condenser lens is varied, Fig. 3 illustrates diagrammatically the confusion of an image point due to defocusing, Fig. 4 shows curves relating the change of aperture and intensity as the strength of a condenser lens is changed periodically, Fig. 5 shows a construction of a condenser lens having alternating current and direct current windings according to the invention, Fig. 6 shows diagrammatically a complete electron microscope, and Fig. 7 is an explanatory diagram illustrating the production of an error due to spherical aberration when using the arrangement of this invention.

A necessary condition in the operation of an electron microscope is that the intensity of illumination must be kept low enough to avoid damage to the specimen. Since the intensity is controlled by variation of the condenser lens power, which also controls the angular aperture of the illumination, working at low intensity means working at a low angular aperture. Fig. 1 shows a typical illuminating system comprising an electron source S, a condenser lens having an aperture at L and an object plane at A, while Fig. 2 shows a curve R relating both the aperture and intensity I of illumination as a function of the field strength H of the condenser lens. It will be clear from Fig. 1 that the maximum angular aperture $\alpha_{max}$ occurs when the condenser lens focuses an image of the source at the object plane. The value of $\alpha_{max}$ depends only on the geometry of the system and is given by:

$$\alpha_{max} = \frac{D}{2v} \quad (1)$$

where D=diameter of aperture L and $v$=distance from aperture to object. When the source is imaged either before or after the object plane, the angular aperture is smaller than $\alpha_{max}$ and is not determined by the physical aperture of the condenser lens.

It shall be assumed that the beam is transmitted through the object without further angular scattering so that the objective aperture is controlled by the illumination aperture.

When the objective lens current is adjusted so that the plane of the final viewing screen is conjugate to the object plane, the image is in exact focus and the detail present in the image depends on the resolving power of the instrument. When the lens current is not so adjusted, the image is diffused or de-focused. The confusion of an image point due to de-focusing is illustrated in Fig. 3. $L_1$ is the imaging system including the objective and one or more projector lenses; $A_1$ is the object and C the image plane. D is the plane conjugate to C so that for correct focus D must coincide with $A_1$. If $A_1D = du$ and the angular aperture of the rays leaving an object point be $\alpha$, then the diameter of the circle of diffusion due to incorrect focusing is given by $$\delta = \alpha \cdot du$$

In the final image the amount of diffusion $\delta$ must be small compared with the resolving power $\Delta_M$ of the instrument. The exact relation between $\delta$ and $\Delta_M$ depends on many other factors including the morphology of the specimen under observation and the resolving power of the photographic plate, but a relationship found suitable in practice is:

$$4\delta = \Delta_M \quad (3)$$

Therefore, the focus must be adjusted so that the displacement between the object and the plane of true focus is equal to or less than $$du = \pm \frac{\Delta_M}{4\alpha_1} \quad (4)$$

where $\alpha_1$ will now be taken as the desired operating aperture.

If the instrument is operated at a magnification $M$, the diffusion in the image is $M\delta$, so that to focus the image by eye this quantity should be just equal to the resolving power of the eye $\Delta_E$ when $$\delta = \frac{\Delta_M}{4}$$

Thus
$$\Delta_E = M\delta$$

Therefore, from Equation 2, $\Delta_E = M\delta = M\alpha du$, and using Equation 4, we have $$\Delta_E = M\alpha \frac{\Delta_M}{4\alpha_1}$$

or $$\alpha = \frac{4\alpha_1 \Delta_E}{M \Delta_M} \quad (6)$$

Equation 6 gives the value to which the operating aperture $\alpha_1$ must be increased to allow accurate visual focusing.

The set of values chosen for calculation purposes will be those consistent with operation of microscope for the highest resolution. The lowest magnification used is about 10,000 times, otherwise the performance is limited by the resolving power of the photographic emulsion. To prevent damage to the specimen and to take best advantage of the objective lens characteristics, the illumination aperture is usually chosen in the region of $5 \times 10^{-4}$ radians, and the resolving power of the microscope may be taken as 20 A. U. If the resolving power of the eye is taken as .01 cm., then we have by Equation 6

$$\alpha = \frac{4 \times 5.10^{-4} \times 10^{-2}}{10^4 \times 20.10^{-8}} = 10^{-2} \text{ radians}$$

The value of $\alpha$ when the condenser lens focuses the electron source on the object is $\alpha_{max}$ given by Equation 1 and, in practice, $\alpha_{max}$ has a value of $5 \times 10^{-3}$ radians, just half that required. However, the factor of 2 involved here is less than the factor of 5 between the resolving power of the eye and the finest detail in the image. Furthermore, it is usually possible to view the image through a magnifying glass giving, say, a magnification of 2 times.

We can, therefore, assume that the value of $\alpha_{max}$ is sufficient for accurate focusing, and this is borne out by practice. It may seem that the easiest way to focus accurately would be to adjust the condenser lens until $\alpha = \alpha_{max}$ and reduce $\alpha$ again after focusing. There are several reasons why this is undesirable, the principal one being that the specimen might be irreparably damaged by the continuous high current density.

The possibility of damage to the specimen is greatly reduced if the time during which the beam is focused on the specimen is made very short, for example, of the order of a few milliseconds. If, in accordance with this invention, the power of the condenser lens is modulated by a superposed alternating component so that the beam is just brought into focus once per cycle, the persistence of vision of the observer's eye creates the illusion that the beam is continuously focused without much increase in intensity. This can be explained with reference to Fig. 4 which again shows the curve R of illumination intensity and aperture against condenser lens field strength shown in Fig. 2. $H_0$ is the field for maximum intensity and aperture and $H_1$ is an arbitrary value assumed to be the operating point. If now an A. C. field $H_a$ is superposed on $H_1$ so that $H_1 + H_a = H_0$, then the illumination will be focused once per cycle and the aperture will vary over the range $\alpha_{max} - \alpha_{min}$. It will be seen from Fig. 1 that this is equivalent to moving the apparent electron source to and fro along the lens axis between definite limits.

The effect on the intensity can be estimated by constructing the alternating component $I_a$ superposed on the working intensity $I_1$ as shown in Fig. 4. It will be seen that, due to the shape of the $\alpha$ vs. H curve, the mean intensity is slightly increased and that the period during which peak intensity exists is of the order of ¼ cycle, or about 5 milliseconds if the frequency of $H_a$ is 50 cycles/sec. As the difference between $H_1$ and $H_0$ is increased, while maintaining the relation $H_1 + H_a = H_0$, the period of peak intensity is decreased. This makes possible a mode of operation which is advantageous in several respects.

The illumination intensity at the aperture required for best resolution is usually lower than the minimum intensity required for visual focusing. Thus, the increase of intensity when the alternating field $H_a$ is applied can be used to raise the intensity to this minimum value so that the recording intensity and aperture are lower. This mode of operation also reduces the risk of damage to the specimen.

The means of superposing the alternating field on the steady condenser lens field is shown in Fig. 5. The magnetic condenser lens 1 comprises a solenoidal winding 2 of some 20,000 turns surrounded by an iron sheath 3 having an axial non-magnetic gap 4. Means for energizing winding 2 to produce a desired focusing field across gap 4 may include leads 5 and 6, which may be connected to a suitable source of direct current (not shown). As a practical matter, the inductance is too high for it to be possible to inject an alternating current from a suitable source 6' directly into the direct current lens supply circuit, consequently the modulating field must be injected by means of a low impedance winding 7 coaxial with the main winding 2. This may be fed from a low voltage winding 8 of a transformer 9 in series with a suitable control rheostat 10 and switch 11.

The excitation required for the auxiliary coil 7 depends on the difference $H_0 - H_1$ and is therefore variable, hence the provision of a rheostat. For a particular application the excitation of the condenser lens for maximum beam intensity is about 800 ampere-turns, and this may be reduced to 600 ampere turns for normal operation. Thus, to preserve the relation $H_1 + H_a = H_0$, a peak alternating excitation of 200 ampere turns is required. This may be provided by a 50 turn winding fed with a current of approximately 3 amperes, root mean square.

Fig. 6, wherein portions corresponding to those in Fig. 5 are identified by like numerals, shows diagrammatically a complete microscope with the focusing device included. The microscope comprises an air tight enclosure 12 within which is disposed a source of electrons including a cathode assembly 12' insulated from an earthed anode 13 by the insulating plate 14. The electron beam is generated by applying a high negative potential, e. g. 50 kv. from a suitable source (not shown), to the cathode 12 and is directed axially by the electric field between cathode and anode. An axial hole 15 in the anode 13 allows the beam to pass through the electron condenser lens 1 formed by the iron sheath 3, main exciting winding 2, and auxiliary winding 7 for focusing as described above. This lens focuses the beam to an axial point near or at the plane of a specimen 16. The specimen is held in a radial rod 17 passing through a gland seal 18 as shown. Pipes 19 and 19' connect the apparatus to a suitable vacuum plant (not shown). The electron beam penetrates the specimen and passes into the electron objective lens 20, which forms a magnified image further along the axis just before a second electron lens 21. This lens further magnifies the image and projects it to the end of the chamber 22, where the electrons fall on a fluorescent screen 23 coated on a glass plate 24. The electron image is thereby converted to a light optical image and is seen by transmission through the plate 24. To focus the image in the plane of 23 the excitation of objective lens 20 is varied until the image appears sharp. This operation is rendered considerably easier by the use of an auxiliary alternating excitation of the condenser lens 1 by passing alternating current through the winding 7 as described above.

The use of the focusing aid of the invention introduces an error due to the spherical aberration of the objective lens. Briefly stated, the reason for this is as follows: since the focal length of a spherically uncorrected lens is shorter for rays passing the outer zones of the lens than for paraxial rays, the image of an object point will appear nearer the lens as the working aperture of the lens is increased. Thus, the temporary use of a large aperture for ease of focusing causes a residual error when the aperture is decreased for recording purposes. Referring to Fig. 7, rays leaving an object point O in the plane $A_2$ with a semi-angular aperture $a_1$ are focused by the lens $L_2$ to an image I in plane $C_2$. $a_1$ is assumed small so that I is the Gaussian image of O. If we consider a cone of rays of aperture $a_{max}$, where $a_{max} > a_1$, the marginal rays are focused nearer the lens in a plane E. Thus, the complete solid cone of rays forms a disc of confusion in plane $C_2$, the diameter of which is given by $$d_1 = C_s M_s (a_{max})^3 \quad (7)$$

Here $C_s$ is the spherical aberration constant of the lens and $M_s$ is the stage magnification.

$$\left(\frac{v}{u}\right)$$

The surface of rotation containing the rays forms a circle of least confusion at a plane F between $C_2$ and the lens where the best focus is obtained. The distance $FC_2 = dv$ is given by $$dv = C_s M_s^2 (a_{max})^2 \quad (8)$$

Thus, when the large aperture is used for focusing, best focus will be obtained when the plane F coincides with the object plane of the projector lenses. Then, when the aperture is decreased to $a_1$, the plane of the image moves to plane $C_2$ and the objective lens is focused on plane $D_2$, conjugate to plane F, instead of on the object in plane $A_2$.

If the distance $A_2 D_2 = du$ then we have by the usual lens formula and Equation 8

$$du = \frac{-f^2}{(v-f)^2} \times dv = \frac{-f^2}{(v-f)^2} \times C_s M_s^2 (a_{max})^2 \quad (9)$$

where $f$ is the focal length of the central portion of the objective lens. The objective lens power must thus be increased slightly after using the focusing device in order to obtain correct focus. This correction is difficult to calculate in practice, since the true image plane $C_2$ will vary slightly with the aperture $a_1$ which depends on the electron scattering at the specimen. However, assuming $a_1$ is considerably smaller than $a_{max}$, we can use Equation 9 in conjunction with the approximate formula for lens focal length $$f = \frac{KV}{I^2} \quad (10)$$

where $V$=accelerating voltage, $I$=excitation current and $K$=constant to obtain the increment of current required. Since $f \cong u$, we can obtain, by differentiation of (1), $$dI = -\frac{I}{2f} \cdot df = -\frac{I}{2f} \cdot du = \frac{I}{2f} \cdot \frac{f^2}{(v-f)^2} C_s M_s^2 (a_{max})^2$$

or $$dI = \frac{C_s M_s^2 (a_{max})^2 I f}{2(v-f)^2} \quad (11)$$

This correction can be applied manually by a slight increase in rotation of the fine focus control or automatically by opening a switch across a small preset resistance (not shown) in the objective lens current control circuit during the focusing operation. A set of practical values to indicate the order of the correction is:

$C_s = 2.$  $M_s = 20.$  $a_{max} = .005$ radians
$I = .05$ amp.  $f = .5$ cm.  $v = 10$ cm.

Thus, $$dI = \frac{2 \cdot (20)^2 \cdot (.005)^2 \cdot (.05) \cdot .5}{2(10-.5)^2} = 1.5 \text{ microamps.}$$

This correction is very small and, for most practical purposes, can be neglected since it represents an aberration of less than 10 A. U. in the final image.

While the invention has been described by reference to particular embodiments thereof, it will be understood by those skilled in the art that numerous modifications may be made without departing from the invention. I, therefore, aim in the appended claims to cover such equivalent variations as come within the true spirit and scope of the foregoing disclosure.

What I claim as new and desire to secure by Letters Patent of the United States is:

1. The method of ascertaining and adjusting the focus of an electron microscope of the type wherein electrons travel from a source through a condenser lens field to a specimen and thence through an objective lens field to a viewing screen, said method comprising: cyclically increasing the angular aperture of the condenser lens at a rate sufficiently rapid to produce a beam of electrons appearing to be continuously focused, and varying the strength of the objective lens field until the image of the specimen is brought to a desired sharp focus on the viewing screen.

2. The method of ascertaining and adjusting the focus of an electron microscope of the type wherein electrons travel from a source through a condenser lens field to a specimen and thence through an objective lens field to a fluorescent screen, said method comprising: moving the apparent source of the electrons to and fro along the axis of the lenses by alternately increasing the angular aperture of the condenser lens, and varying the strength of the objective lens field until the image of the specimen is brought to a desired sharp focus on the screen.

3. The method of ascertaining and adjusting the focus of an electron microscope of the type wherein electrons travel from a source through a condenser lens field to a specimen and thence through an objective lens field to a fluorescent screen, said method comprising: moving the apparent source of the electrons to and fro along the axis of the lenses by cyclically increasing the angular aperture of the condenser lens, varying the strength of the objective lens field until the image of the specimen is brought to an apparent sharp focus on the screen, and altering the strength of the objective lens field from said apparent sharp focus position to compensate for spherical aberration.

4. The method of ascertaining and adjusting the focus of an electron microscope of the type wherein electrons travel from a source through a condenser lens field to a specimen and thence through an objective lens field to a fluorescent screen, said method comprising: moving the apparent source of the electrons to and fro along the axis of the lenses by alternately and repeatedly increasing the angular aperture of the condenser lens, varying the strength of the objective lens field until the image of the specimen is brought to an apparent sharp focus on the screen, causing the angular aperture of the condenser lens to be maintained at the desired working value of aperture, and increasing the strength of the objective lens field from said apparent sharp focus position to compensate for spherical aberration.

5. The method of ascertaining and adjusting the focus of an electron microscope of the type wherein electrons travel from a source through a condenser lens field to a specimen and thence through an objective lens field to a fluorescent screen, said method comprising: adjusting the condenser lens field to a desired constant value of angular aperture, varying the angular aperture of the condenser lens field from said desired constant value by modulating the field with an alternating component, and varying the strength of the objective lens field until the image of the specimen is brought to a desired sharp focus on the screen.

6. The method of ascertaining and adjusting the focus of an electron microscope of the type wherein electrons travel from a source through a condenser lens field to a specimen and thence through an objective lens field to a fluorescent screen, said method comprising: adjusting the condenser lens field to a desired constant value of angular aperture, varying the angular aperture of the condenser lens field from said desired constant value by modulating the field with an alternating component, varying the strength of the objective lens field until the image of the specimen is brought to an apparent sharp focus on the screen, and altering the strength of the objective lens field from said apparent sharp focus position to compensate for spherical aberration.

7. The method of ascertaining and adjusting the focus of an electron microscope of the type wherein electrons travel from a source through a condenser lens field to a specimen and thence through an objective lens field to a fluorescent screen, said method comprising: adjusting the condenser lens field to a desired constant value of angular aperture, varying the angular aperture of the condenser lens field from said desired constant value by modulating the field with an alternating component, varying the strength of the objective lens field until the image of the specimen is brought to a desired sharp focus on the screen, removing said alternating component from the condenser lens field, and adjusting the constant value of the condenser lens field to the desired value of working aperture.

8. The method of ascertaining and adjusting the focus of an electron microscope of the type wherein electrons travel from a source through a magnetic condenser lens field to a specimen and thence through an objective lens field to a fluorescent screen, said method comprising: adjusting the condenser lens field to a desired constant intensity $H_1$, superposing an alternating component of field upon said constant field having said intensity $H_1$, said alternating component having a peak intensity $H_a$ such that the combined peak intensity $H_0$ of said constant and alternating fields equals the field for maximum illumination intensity and aperture, and varying the strength of the objective lens field until the image of the specimen is brought to a desired sharp focus on the screen.

9. The method of ascertaining and adjusting the focus of an electron microscope of the type wherein electrons travel from a source through a magnetic condenser lens field to a specimen and thence through an objective lens field to a fluorescent screen, said method comprising: adjusting the condenser lens field to a desired constant intensity $H_1$, superposing an alternating component of field upon said constant field having said intensity $H_1$, said alternating component having a peak intensity $H_a$ such that the combined peak intensity $H_0$ of said constant and alternating fields equals the field for maximum illumination intensity and aperture, varying the strength of the objective lens until the image of the specimen is brought to an apparent sharp focus on the screen, and altering the strength of the objective lens from said apparent sharp focus position to compensate for spherical aberration.

10. The method of ascertaining and adjusting the focus of an electron microscope of the type wherein electrons travel from a source through a magnetic condenser lens field to a specimen and thence through an objective lens field to a fluorescent screen, said method comprising: adjusting the condenser lens field to a desired constant intensity $H_1$, superposing a time-varying component of magnetic field upon said constant field having said intensity $H_1$, said time-varying component having a peak intensity $H_a$ such that the combined peak intensity $H_0$ of said constant and time-varying fields in the same direction equals the field for maximum illumination intensity and aperture, and varying the strength of the objective lens field until the image of the specimen is brought to a desired sharp focus on the screen.

11. In an electron microscope wherein electrons travel from a source through a magnetic condenser lens to a specimen and thence through an objective lens to a fluorescent screen, a separate energizing winding on said condenser lens and means for energizing said winding with a time-varying current.

12. In an electron microscope wherein electrons travel from a source through a magnetic condenser lens to a specimen and thence through an objective lens to a fluorescent screen, a separate energizing winding on said condenser lens and means for energizing said winding with a time-varying current having a variable amplitude.

13. In an electron microscope wherein electrons travel along an electron optical axis from a source to a specimen and thence through an objective lens to a fluorescent screen, a condenser lens between said source and said specimen for focusing said electrons, said condenser lens comprising a direct current winding, a second winding adjacent said direct current winding, and means for energizing said second winding with time-varying current.

14. In an electron microscope wherein electrons travel along an electron optical axis from a source to a specimen and thence through an objective lens to a fluorescent screen, a magnetic condenser lens between said source and said specimen for focusing said electrons, said condenser lens comprising a solenoidal direct current winding, a second winding coaxial with said direct current winding, and means for energizing said second winding with alternating current.

15. In an electron microscope wherein electrons travel along an electron optical axis from a source to a specimen and thence through an objective lens to a fluorescent screen, a magnetic condenser lens between said source and said specimen for focusing said electrons, said condenser lens comprising a solenoidal direct current winding, a second winding coaxial with said direct current winding, means for energizing said second winding with alternating current, and a magnetic sheath having an axial non-magnetic gap and surrounding both said windings.

RICHARD S. PAGE.

References Cited in the file of this patent

UNITED STATES PATENTS

| Number | Name | Date |
|---|---|---|
| 2,354,287 | Zworykin et al. | July 25, 1944 |
| 2,464,396 | Hillier et al. | Mar. 15, 1949 |
| 2,485,754 | Le Poole | Oct. 25, 1949 |